(12) United States Patent
Burke

(10) Patent No.: US 11,216,847 B2
(45) Date of Patent: Jan. 4, 2022

(54) SYSTEM AND METHOD FOR RETAIL CUSTOMER TRACKING IN SURVEILLANCE CAMERA NETWORK

(71) Applicant: Sensormatic Electronics, LLC, Boca Raton, FL (US)

(72) Inventor: Anthony Burke, Noblesville, IN (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 535 days.

(21) Appl. No.: 15/076,708

(22) Filed: Mar. 22, 2016

(65) Prior Publication Data

US 2017/0278137 A1     Sep. 28, 2017

(51) Int. Cl.
*G06Q 30/02* (2012.01)
*G06K 9/00* (2006.01)
*G06F 16/783* (2019.01)

(52) U.S. Cl.
CPC ....... *G06Q 30/0268* (2013.01); *G06F 16/784* (2019.01); *G06K 9/00771* (2013.01);
(Continued)

(58) Field of Classification Search
CPC .............. G06Q 30/02; G06Q 30/0268; G06Q 30/0269; G06Q 30/0255; G06F 16/784; G06K 9/00771; G06K 9/00288
See application file for complete search history.

(56) References Cited

U.S. PATENT DOCUMENTS 3,217,098 A   11/1965   Oswald
4,940,925 A   7/1990   Wand et al.
(Continued)

FOREIGN PATENT DOCUMENTS

EP   2 164 003 A1   3/2010
EP   2 538 672 A1   12/2012
(Continued)

OTHER PUBLICATIONS

Zhang et al., "An Examination of Social Influence on Shopper Behavior Using Video Tracking Data" (published in Journal of Marketing, vol. 78, Issue 5, Sep. 2014, pp. 24-41) (Year: 2014).*

(Continued)

*Primary Examiner* — Abhishek Vyas
*Assistant Examiner* — Patrick Kim
(74) *Attorney, Agent, or Firm* — HoustonHogle LLP

(57) ABSTRACT

A retail customer tracking system and method is disclosed. The retail system preferably includes at least one surveillance camera for generating image data of customer interactions with products and at least one point of sale camera for generating image data of customers at a point of sale area. An analytics system determines product interactions from the image data of the customer interactions with the products and stores facial image information and the product interactions for each of the customers. When a customer arrives at a point of sale area, facial image information of the customer determined from the image data of the point of sale camera is matched to previously stored facial information for the customer, and associated product interactions for the customer are provided to a management system. The management system then provides sale cues based on the product interactions to the customer at the point of sale area.

28 Claims, 7 Drawing Sheets

(52) U.S. Cl.
CPC ..... *G06Q 30/0255* (2013.01); *G06Q 30/0269* (2013.01); *G06K 9/00288* (2013.01)

(56) References Cited

U.S. PATENT DOCUMENTS

| | | | |
|---|---|---|---|
| 5,164,827 A | 11/1992 | Paff | |
| 5,204,536 A | 4/1993 | Vardi | |
| 5,317,394 A | 5/1994 | Hale et al. | |
| 5,729,471 A | 3/1998 | Jain et al. | |
| 5,850,352 A | 12/1998 | Moezzi et al. | |
| 5,940,538 A | 8/1999 | Spiegel et al. | |
| 5,951,695 A | 9/1999 | Kolovson | |
| 5,969,755 A | 10/1999 | Courtney | |
| 6,341,183 B1 | 1/2002 | Goldberg | |
| 6,359,647 B1 | 3/2002 | Sengupta et al. | |
| 6,581,000 B2 | 6/2003 | Hills et al. | |
| 6,643,795 B1 | 11/2003 | Sicola et al. | |
| 6,724,421 B1 | 4/2004 | Glatt | |
| 6,812,835 B2 | 11/2004 | Ito et al. | |
| 6,970,083 B2 | 11/2005 | Venetianer et al. | |
| 7,091,949 B2 | 8/2006 | Hansen | |
| 7,242,423 B2 | 7/2007 | Lin | |
| 7,286,157 B2 | 10/2007 | Buehler | |
| 7,342,489 B1 | 3/2008 | Milinusic et al. | |
| 7,382,244 B1 | 6/2008 | Donovan et al. | |
| 7,409,076 B2 | 8/2008 | Brown et al. | |
| 7,428,002 B2 | 9/2008 | Monroe | |
| 7,450,735 B1 | 11/2008 | Shah et al. | |
| 7,456,596 B2 | 11/2008 | Goodall et al. | |
| 7,460,149 B1 | 12/2008 | Donovan et al. | |
| 7,529,388 B2 | 5/2009 | Brown et al. | |
| 7,623,152 B1 | 11/2009 | Kaplinsky | |
| 7,623,676 B2 | 11/2009 | Zhao et al. | |
| 7,733,375 B2 | 6/2010 | Mahowald | |
| 7,996,718 B1 | 8/2011 | Ou et al. | |
| 8,249,301 B2 | 8/2012 | Brown et al. | |
| 8,300,102 B2 | 10/2012 | Nam et al. | |
| 8,325,979 B2 | 12/2012 | Taborowski et al. | |
| 8,482,609 B1 | 7/2013 | Mishra et al. | |
| 8,483,490 B2 | 7/2013 | Brown et al. | |
| 8,502,868 B2 | 8/2013 | Buehler et al. | |
| 8,558,907 B2 | 10/2013 | Goh et al. | |
| 8,594,482 B2 | 11/2013 | Fan et al. | |
| 8,675,074 B2 | 3/2014 | Salgar et al. | |
| 8,723,952 B1 | 5/2014 | Rozenboim | |
| 8,849,764 B1 | 9/2014 | Long et al. | |
| 8,995,712 B2 | 3/2015 | Huang et al. | |
| 9,015,167 B1 | 4/2015 | Ballou et al. | |
| 9,058,520 B2 | 6/2015 | Xie et al. | |
| 9,094,615 B2 | 7/2015 | Aman et al. | |
| 9,129,179 B1 | 9/2015 | Wong | |
| 9,158,975 B2 | 10/2015 | Lipton et al. | |
| 9,168,882 B1 | 10/2015 | Mirza et al. | |
| 9,197,861 B2 | 11/2015 | Saptharishi et al. | |
| 9,280,833 B2 | 3/2016 | Brown et al. | |
| 9,412,269 B2 | 8/2016 | Saptharishi et al. | |
| 9,495,614 B1 | 11/2016 | Boman et al. | |
| 9,594,963 B2 | 3/2017 | Bobbitt et al. | |
| 9,641,763 B2 | 5/2017 | Bernal et al. | |
| 9,674,458 B2 | 6/2017 | Teich et al. | |
| 9,785,898 B2 | 10/2017 | Hofman et al. | |
| 9,860,554 B2 | 1/2018 | Samuelsson et al. | |
| 9,965,680 B2 | 5/2018 | Burke et al. | |
| 9,967,446 B2 | 5/2018 | Park | |
| 2002/0104098 A1 | 8/2002 | Zustak et al. | |
| 2003/0107649 A1 | 6/2003 | Flickner et al. | |
| 2003/0169337 A1 | 9/2003 | Wilson et al. | |
| 2005/0012817 A1 | 1/2005 | Hampapur et al. | |
| 2005/0057653 A1 | 3/2005 | Maruya | |
| 2006/0001742 A1 | 1/2006 | Park | |
| 2006/0173856 A1 | 8/2006 | Jackson et al. | |
| 2006/0181612 A1 | 8/2006 | Lee et al. | |
| 2006/0239645 A1 | 10/2006 | Curtner et al. | |
| 2006/0243798 A1 | 11/2006 | Kundu et al. | |
| 2007/0178823 A1 | 8/2007 | Aronstam et al. | |
| 2007/0182818 A1 | 8/2007 | Buehler | |
| 2007/0279494 A1 | 12/2007 | Aman et al. | |
| 2007/0294207 A1 | 12/2007 | Brown et al. | |
| 2008/0004036 A1 | 1/2008 | Bhuta et al. | |
| 2008/0101789 A1 | 5/2008 | Sharma | |
| 2008/0114477 A1 | 5/2008 | Wu | |
| 2008/0158336 A1 | 7/2008 | Benson et al. | |
| 2009/0237508 A1 | 9/2009 | Arpa et al. | |
| 2009/0268033 A1 | 10/2009 | Ukita | |
| 2009/0273663 A1 | 11/2009 | Yoshida | |
| 2009/0284601 A1 | 11/2009 | Eledath et al. | |
| 2010/0013917 A1 | 1/2010 | Hanna et al. | |
| 2010/0110212 A1 | 5/2010 | Kuwahara et al. | |
| 2010/0153182 A1 | 6/2010 | Quinn et al. | |
| 2010/0232288 A1 | 9/2010 | Coatney et al. | |
| 2011/0043631 A1 | 2/2011 | Marman et al. | |
| 2011/0128384 A1 | 6/2011 | Tiscareno et al. | |
| 2011/0246626 A1 | 10/2011 | Peterson et al. | |
| 2011/0289119 A1 | 11/2011 | Hu et al. | |
| 2011/0289417 A1 | 11/2011 | Schaefer et al. | |
| 2011/0320861 A1 | 12/2011 | Bayer et al. | |
| 2012/0072420 A1 | 3/2012 | Moganti et al. | |
| 2012/0098969 A1 | 4/2012 | Wengrovitz et al. | |
| 2012/0206605 A1 | 8/2012 | Buehler et al. | |
| 2012/0226526 A1 | 9/2012 | Donovan et al. | |
| 2013/0166711 A1 | 6/2013 | Wang et al. | |
| 2013/0169801 A1 | 7/2013 | Martin et al. | |
| 2013/0223625 A1 | 8/2013 | de Waal et al. | |
| 2013/0278780 A1 | 10/2013 | Cazier et al. | |
| 2013/0343731 A1 | 12/2013 | Pashkevich et al. | |
| 2014/0085480 A1 | 3/2014 | Saptharishi | |
| 2014/0172627 A1* | 6/2014 | Levy | G06Q 30/0631 705/26.7 |
| 2014/0211018 A1 | 7/2014 | de Lima et al. | |
| 2014/0218520 A1 | 8/2014 | Teich et al. | |
| 2014/0282991 A1 | 9/2014 | Watanabe et al. | |
| 2014/0330729 A1* | 11/2014 | Colangelo | G06Q 20/40145 705/72 |
| 2014/0362223 A1* | 12/2014 | LaCroix | G08B 13/19613 348/150 |
| 2015/0039458 A1* | 2/2015 | Reid | G06K 9/00771 705/26.1 |
| 2015/0092052 A1 | 4/2015 | Shin et al. | |
| 2015/0121470 A1 | 4/2015 | Rongo et al. | |
| 2015/0208040 A1 | 7/2015 | Chen et al. | |
| 2015/0215583 A1 | 7/2015 | Chang | |
| 2015/0244992 A1 | 8/2015 | Buehler | |
| 2015/0249496 A1 | 9/2015 | Muijs et al. | |
| 2015/0294119 A1 | 10/2015 | Gundam et al. | |
| 2015/0358576 A1 | 12/2015 | Hirose et al. | |
| 2015/0379729 A1 | 12/2015 | Datta et al. | |
| 2015/0381946 A1 | 12/2015 | Renkis | |
| 2016/0014381 A1 | 1/2016 | Rolf et al. | |
| 2016/0065615 A1 | 3/2016 | Scanzano et al. | |
| 2016/0224430 A1 | 8/2016 | Long et al. | |
| 2016/0225121 A1 | 8/2016 | Gupta et al. | |
| 2016/0269631 A1 | 9/2016 | Jiang et al. | |
| 2016/0357648 A1 | 12/2016 | Keremane et al. | |
| 2016/0379074 A1 | 12/2016 | Nielsen et al. | |
| 2017/0193673 A1 | 7/2017 | Heidemann et al. | |
| 2017/0277785 A1 | 9/2017 | Burke | |
| 2017/0277947 A1 | 9/2017 | Burke et al. | |
| 2017/0277967 A1 | 9/2017 | Burke et al. | |
| 2017/0278365 A1 | 9/2017 | Madar et al. | |
| 2017/0278366 A1 | 9/2017 | Burke et al. | |
| 2017/0278367 A1 | 9/2017 | Burke et al. | |
| 2017/0278368 A1 | 9/2017 | Burke | |
| 2017/0280043 A1 | 9/2017 | Burke et al. | |
| 2017/0280102 A1 | 9/2017 | Burke | |
| 2017/0280103 A1 | 9/2017 | Burke et al. | |
| 2018/0218209 A1 | 8/2018 | Burke et al. | |

FOREIGN PATENT DOCUMENTS

| | | |
|---|---|---|
| JP | 2003151048 A | 5/2003 |
| JP | 2010074382 A | 4/2010 |

(56) References Cited

FOREIGN PATENT DOCUMENTS

| WO | 2007/030168 A1 | 3/2007 |
|---|---|---|
| WO | 2013/141742 A1 | 9/2013 |
| WO | 2014/114754 A1 | 7/2014 |

OTHER PUBLICATIONS

International Search Report and the Written Opinion of the International Searching Authority, dated May 31, 2017, from International Application No. PCT/US2017/023430, filed Mar. 21, 2017. Fourteen pages.

International Search Report and the Written Opinion of the International Searching Authority, dated Jun. 12, 2017, from International Application No. PCT/US2017/023440, filed on Mar. 21, 2017. Fourteen pages.

International Search Report and the Written Opinion of the International Searching Authority, dated Jun. 19, 2017, from International Application No. PCT/US2017/023436, filed on Mar. 21, 2017. Fourteen pages.

International Search Report and the Written Opinion of the International Searching Authority, dated Jun. 21, 2017, from International Application No. PCT/US2017/023444, filed on Mar. 21, 2017. Thirteen pages.

International Search Report and the Written Opinion of the International Searching Authority, dated Jun. 28, 2017, from International Application No. PCT/US2017/023434, filed on Mar. 21, 2017. Thirteen pages.

International Preliminary Report on Patentability, dated Oct. 4, 2018, from International Application No. PCT/US2017/023440, filed on Mar. 21, 2017. Eight pages.

International Preliminary Report on Patentability, dated Oct. 4, 2018, from International Application No. PCT/US2017/023434, filed on Mar. 21, 2017. Eight pages.

International Preliminary Report on Patentability, dated Oct. 4, 2018, from International Application No. PCT/US2017/023430, filed Mar. 21, 2017. Eight pages.

International Preliminary Report on Patentability, dated Oct. 4, 2018, from International Application No. PCT/US2017/023436, filed on Mar. 21, 2017. Eight pages.

International Preliminary Report on Patentability, dated Oct. 4, 2018, from International Application No. PCT/US2017/023444, filed on Mar. 21, 2017. Seven pages.

Weilin, L., et al., "Personalization of Trending Tweets Using Like-Dislike Caegory Model," Procedia Computer Science, 60: 236-245 (2015).

* cited by examiner

SYSTEM AND METHOD FOR RETAIL CUSTOMER TRACKING IN SURVEILLANCE CAMERA NETWORK

RELATED APPLICATIONS

This application is related to:

U.S. application Ser. No. 15/076,701 filed on Mar. 22, 2016, entitled "Method and system for surveillance camera arbitration of uplink consumption," now U.S. Patent Publication No.: 2017/0278368 A1;

U.S. application Ser. No. 15/076,703 filed on Mar. 22, 2016, entitled "Method and system for pooled local storage by surveillance cameras," now U.S. Patent Publication No.: 2017/0280102 A1;

U.S. application Ser. No. 15/076,704 filed on Mar. 22, 2016, entitled "System and method for designating surveillance camera regions of interest," now U.S. Patent Publication No.: 2017/0277967 A1;

U.S. application Ser. No. 15/076,705 filed on Mar. 22, 2016, entitled "System and method for deadzone detection in surveillance camera network," now U.S. Patent Publication No.: 2017/0278366 A1;

U.S. application Ser. No. 15/076,706 filed on Mar. 22, 2016, entitled "System and method for overlap detection in surveillance camera network," now U.S. Patent Publication No.: 2017/0278367 A1;

U.S. application Ser. No. 15/076,709 filed on Mar. 22, 2016, entitled "Method and system for modeling image of interest to users," now U.S. Patent Publication No.: 2017/0277785 A1;

U.S. application Ser. No. 15/076,710 filed on Mar. 22, 2016, entitled "System and method for using mobile device of zone and correlated motion detection," now U.S. Patent Publication No.: 2017/0280103 A1;

U.S. application Ser. No. 15/076,712 filed on Mar. 22, 2016, entitled "Method and system for conveying data from monitored scene via surveillance cameras," now U.S. Patent Publication No.: 2017/0277947 A1;

U.S. application Ser. No. 15/076,713 filed on Mar. 22, 2016, entitled "System and method for configuring surveillance cameras using mobile computing devices," now U.S. Patent Publication No.: 2017/0278365 A1; and U.S. application Ser. No. 15/076,717 filed on Mar. 22, 2016, entitled "System and method for controlling surveillance cameras," now U.S. Patent Publication No.: 2017/0280043 A1.

All of the afore-mentioned applications are incorporated herein by this reference in their entirety.

BACKGROUND OF THE INVENTION

Modern surveillance systems typically include one or more surveillance cameras that capture image data of scenes and an analytics system. Traditionally, these surveillance systems can provide both live monitoring of individuals, and forensic analysis of saved image data. Of increasing interest is the monitoring of point of sale ("POS") areas to track customer-salesperson interactions in retail establishments and near POS terminals. This can be used, in examples, to detect potentially suspicious transactions and instances of theft.

At a basic level, analytics systems provide the ability to detect and track individuals and objects within the image data of the monitored scenes. Other capabilities include the ability to determine motion of objects relative to visual cues superimposed upon the image data and to search for specific behaviors of interest within the image data. The visual cues are often placed near fixed objects or points of interest in the background scene of the image data to infer motion of objects relative to the visual cues. In one example, virtual tripwire visual cues can be located near entryways within the scene to detect entry or exit of individuals through the entryways and to provide a count of the individuals passing through the entryways over a specific time period.

SUMMARY OF THE INVENTION

Surveillance systems have evolved from traditional applications of tracking individuals and identifying theft or suspicious activities in monitored areas to include other capabilities. It is possible for these systems to determine and save product interactions for individuals, and also recognize individuals from their facial characteristics. Further still, the systems can be integrated with retail management systems to provide targeted advertising and upsell capabilities to individual consumers at point of sale areas, based on the products purchased by the consumers and their product interactions, in examples.

It would be beneficial to provide a retail customer tracking system that tracks individuals as they move within retail establishments and interact with products therein. One or more surveillance cameras of the retail system can capture image data of the individuals as the individuals enter and move through the retail establishment and interact with the products. From the image data, an analytics system can then determine the product interactions for each of the individuals and identify the individuals from their facial features. The facial features and determined product interactions for each individual can then be stored for later use, such as to provide additional sales opportunities at point of sale terminals of the retail establishments for the tracked individuals based on their determined product interactions. A surveillance camera mounted near the point of sale terminal could capture image data of the individuals as they transact business at the point of sale terminal, and the analytics system could compare the facial features of the individual determined from the image data of the point of sale camera to the previously stored facial images for individuals. In examples, the previously determined product interactions for the individuals can be compared with sales promotional information on a management system. The sales promotional information could suggest other products based on products purchased by the individuals, and could suggest other products based on those products touched but not selected by the individuals, in examples.

In general, according to one aspect, the invention features a retail system. The system can comprise at least one surveillance camera for generating image data of customer interactions with products, at least one point of sale camera for generating image data of customers at a point of sale area, an analytics system for determining product interactions from the image data of the customer interactions with the products, and a management system for providing information based on the product interactions when the customers arrive at the point of sale area.

For example, the product interactions might include products selected by the customers, products touched but not selected by the customers, and/or products neither touched nor selected by the customers located near aisles or shelves visited b customers.

Further, a point of sale terminal of the point of sale area might provide a list of purchased products to the management system and present the information provided by the management system. The point of sale terminal display can provide a point of sale display graphic that includes facial images of the customer, a list of purchased products, and/or a list of suggested products based on the list of purchased products and/or the product interactions.

The information can include sale cues that include product scripts that include statements associated with products for audible and/or visual presentation at the point of sale area. The can be presented directly to the customers and/or presented to a salesperson.

The analytics system might determine the product interactions from the image data of the customer interactions with the products by referencing product region overlays. A customer interaction database will have entries for customers, wherein each entry includes facial image information of a customer and/or the determined product interactions for the customer.

In general, according to another aspect, the invention features a customer tracking method. This method comprises at least one surveillance camera generating image data of customer interactions with products, at least one point of sale camera generating image data of customers at a point of sale area, determining product interactions from the image data of the customer interactions with the products, and providing information based on the product interactions when the customers arrive at the point of sale area.

In general, according to another aspect, the invention features a sales promotion method. This method comprises at least one surveillance camera generating image data of customer interactions with products, at least one point of sale camera for generating image data of customers at a point of sale area, determining product interactions for and facial image information of the customers from the image data of the customer interactions with the products, obtaining the product interactions for the customers when they arrive at the point of sale area, and presenting information at the point of sale area concerning other products based on the product interactions for the customers.

In general, according to still another aspect, the invention features a sales promotion system. The sales promotion system comprises at least one surveillance camera for generating image data of customer interactions with products at a retail location, at least one point of sale camera for generating image data of the customers at a point of sale area, an analytics system and a management system. The analytics system determines product interactions for and facial information of the customers from the image data of the customer interactions with the products. The management system obtains the product interactions for the customers when the customers arrive at the point of sale area, and presents information concerning other products based on the product interactions for the customers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
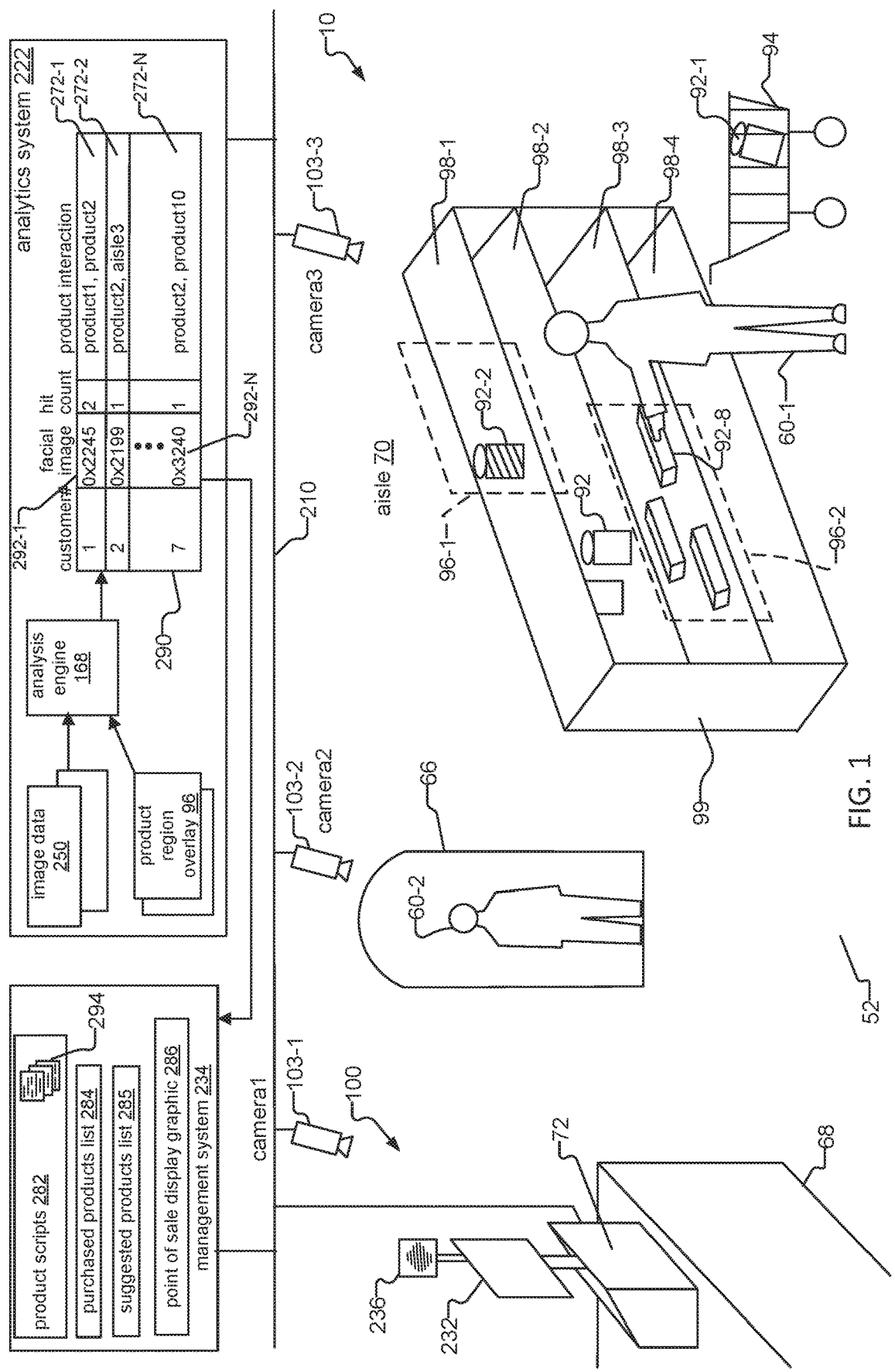
FIG. 1 is a schematic drawing showing a network of surveillance cameras at a retail store for monitoring customers and interactions with products along with a point of sale terminal in a point of sale area.

FIG. 1 shows an exemplary retail sales promotion system 10 to which the invention is applicable.

The system 10 includes a point of sale area 100, an analytics system 222, a management system 234, and surveillance cameras 103. Surveillance cameras 103-1, 103-2, and 103-3 (camera1, camera2, and camera3, respectively) communicate over a local network 210. The local network 210 may be wired, wireless, or a hybrid of wired and wireless links.

The point of sale area 100 includes a point of sale terminal 72, which sits on top of a desk or platform 68, possibly. The point of sale terminal 72 includes a display screen 232 and a speaker 236. The point of sale terminal 72 also communicates over the local network 210 with the surveillance cameras 103, analytics system 222, and management system 234.

Customers 60-1 interact with products 92 within the retail store 10. The products 92 might typically be located on shelves 98 within kiosks or retail shelving units 99. The retail shelving units 99 can be located between aisles 70 or mounted to walls of the retail store, in examples. The customers 60 select the products 92 located on shelves 98-1 through 98-4 and place the products 92 in a shopping cart 94 for checkout at the point of sale area 100 in one specific example for the purposes of presenting the invention.

Specific examples showing how the cameras 103 might be deployed are illustrated. Preferably, at least one surveillance camera 103 such as camera3 103-3 monitors customers as they move throughout aisles 70 of the premises 52 and interact with products. In addition, at least one other surveillance camera 103 such as camera1 103-1 is preferably installed to monitor the point of sale area 100. In general, the point of sale area is the region where payment is tendered and/or the ownership passes from the entity that owns the store to the customer. For this reason, camera2 103-1 is also referred to as a point of sale camera. Camera2 103-2 is installed to monitor a doorway 66 from which one or more customers 60-2 enter or exit the retail store 52.

The analytics system 222, in one implementation, includes an analysis engine 168 and includes one or more product region overlays 96. An installer or operator of the system 10 typically defines a separate product region overlay 96 for each product 92. In one example, the installer defines the product region overlays 96 using a graphical user interface (GUI) program that enables the installer to outline the product region overlays 96 relative to a still frame of image data 250 of the scene captured by one or more of the surveillance cameras 103. In examples, the analytics system 222 can be an external analytics system, one or more analytics systems integrated within the surveillance cameras 103, and/or an analytics system executing within the context of the management system 234.

The analytics system 222 determines product interactions from the image data 250 of the customer interactions with the products 92, such as image data 250 captured from camera3 103-3. Preferably, the analytics system 222 determines the product interactions from the image data of the customer interactions with the products by referencing product region overlays 96 associated with the products 92.

With respect to the example, the installer or operator has defined product region overlays 96-1 and 96-2 relative to a still frame created from image data 250 of the scene captured by camera3 103-3. Product region overlay 96-1 is associated with product 92-2 and product region overlay 96-2 is associated with product 92-8. In examples, the product interactions include products 92 selected by the customers 60, products 92 touched but not selected by the customers 60, and/or products 92 neither touched nor selected by the customers 60 located near aisles 70 or shelves 98 visited by the customers 60.

The analysis engine 168 of analytics system 222 receives the image data 250 and the product region overlays 96, and builds or populates a customer database 290. The customer database 290 typically includes a separate entry or record 272 for each of the customers 60. Each entry 272 includes the product interactions and/or facial image information 292 for each customer 60. In addition, each entry 272 includes a unique identifier for each customer, and can additionally store information in a "hit count" field that tracks how many times the customer 60 has entered or exited the retail store 52 via the doorway 66.

The management system 234 includes product scripts 282, a list of purchased products 284, a suggested products list 285, and a point-of-sale display graphic 286. The product scripts 282 include sales statements 294 associated with products 92 for audible and/or visual presentation at the point of sale area 100. Preferably, the sales statements 294 associated with products 92 are presented at the point of sale area 100 via the point of display terminal 72. However, the sales statements 294 could also be presented over a loudspeaker system at the retail store 52 or delivered to a mobile computing device (smart phone or tablet) carried by a salesperson walking the floor of the retail store 10, in other examples.

The management system 234 also receives the contents of the customer database 290. In response to obtaining the product interactions for a given customer from the entry 272 for the customer 60 in the database 290, the management system 234 can execute a lookup of the product interactions against the product scripts 282 to determine any product scripts for products 92 associated with the product interactions. In this way, the product scripts 282 are one example of sale cues based on the product interactions when the customers 60 arrive at the point of sale area 100 or at some other designated point in the store.

Figure 2:
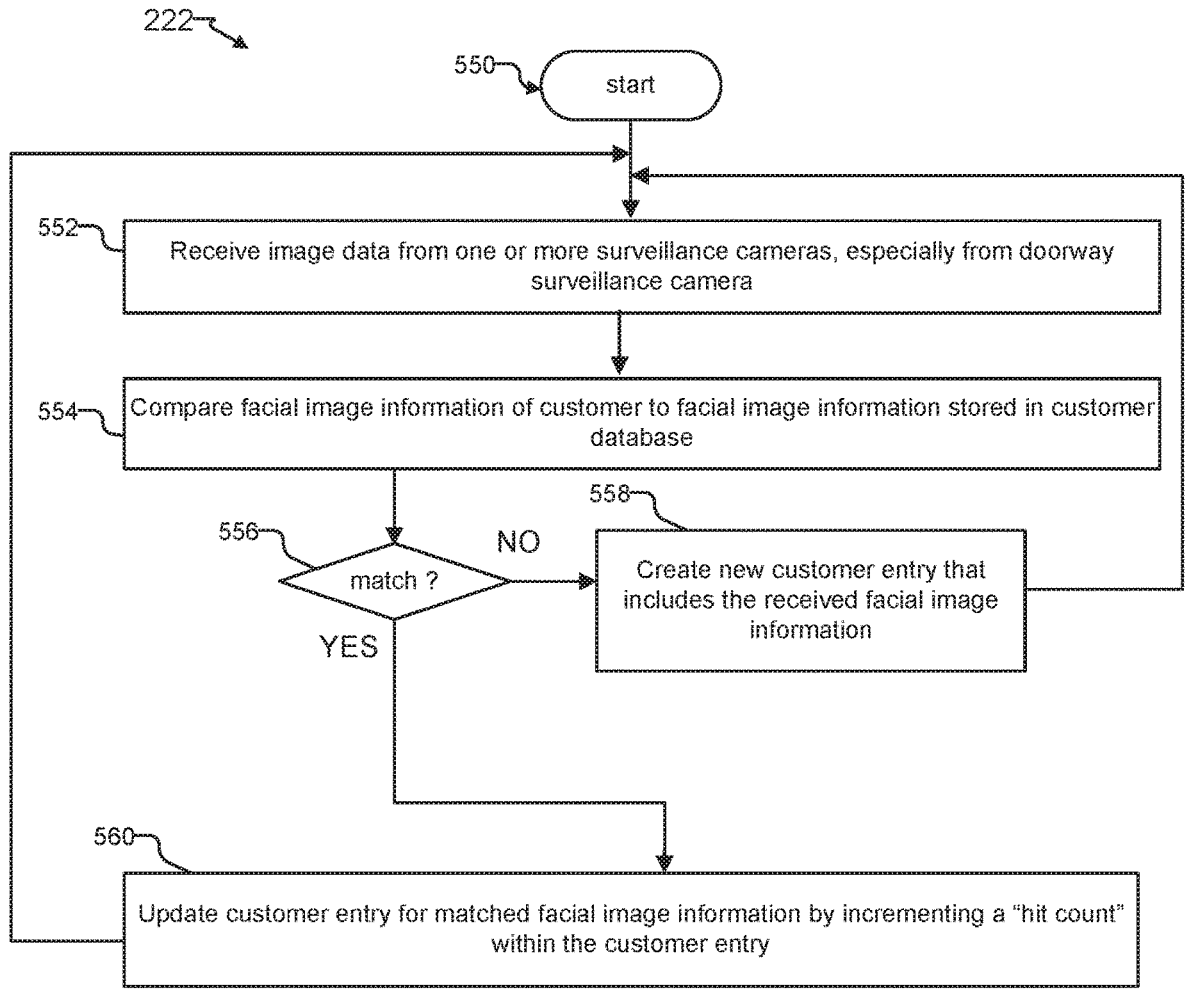
FIG. 2 is a flow diagram showing a process for adding new customers to a tracking database by an analytics system.

FIG. 2 shows a method executed by the analytics system 222 for determining facial image information 292 of customers 60-2 as they either enter or exit a retail store 52 through doorway 66 and updating the customer database. The method begins in step 550.

In step 552, the analytics system 222 receives image data 250 from one or more surveillance cameras 130, especially from doorway surveillance camera "camera2" 103-2. According to step 554, the analytics system 222 compares facial image information 292 of the customer 60 within the received image data 250 to facial image information 292 stored in the customer database 290.

In step 556, if the analytics system 222 finds a match between stored facial image information 292 (e.g. within an entry 272 of the customer database 290 for a specific customer 60) and the facial image information 292 from the doorway camera2 103-2, the method transitions to step 560. If no match was found, the method transitions to step 558.

In step 558, the analytics system creates a new customer entry 272 that includes the received facial image information 292. When a match was found in step 556, according to step 560, the analytics system 222 updates the customer entry 272 for the matched facial image information 292 by incrementing a "hit count" field within the customer entry 272. Upon conclusion of both steps 560 and 558, the method then transitions back to the beginning of step 552 to receive the next frame of image data 250 to process.

Figure 3:
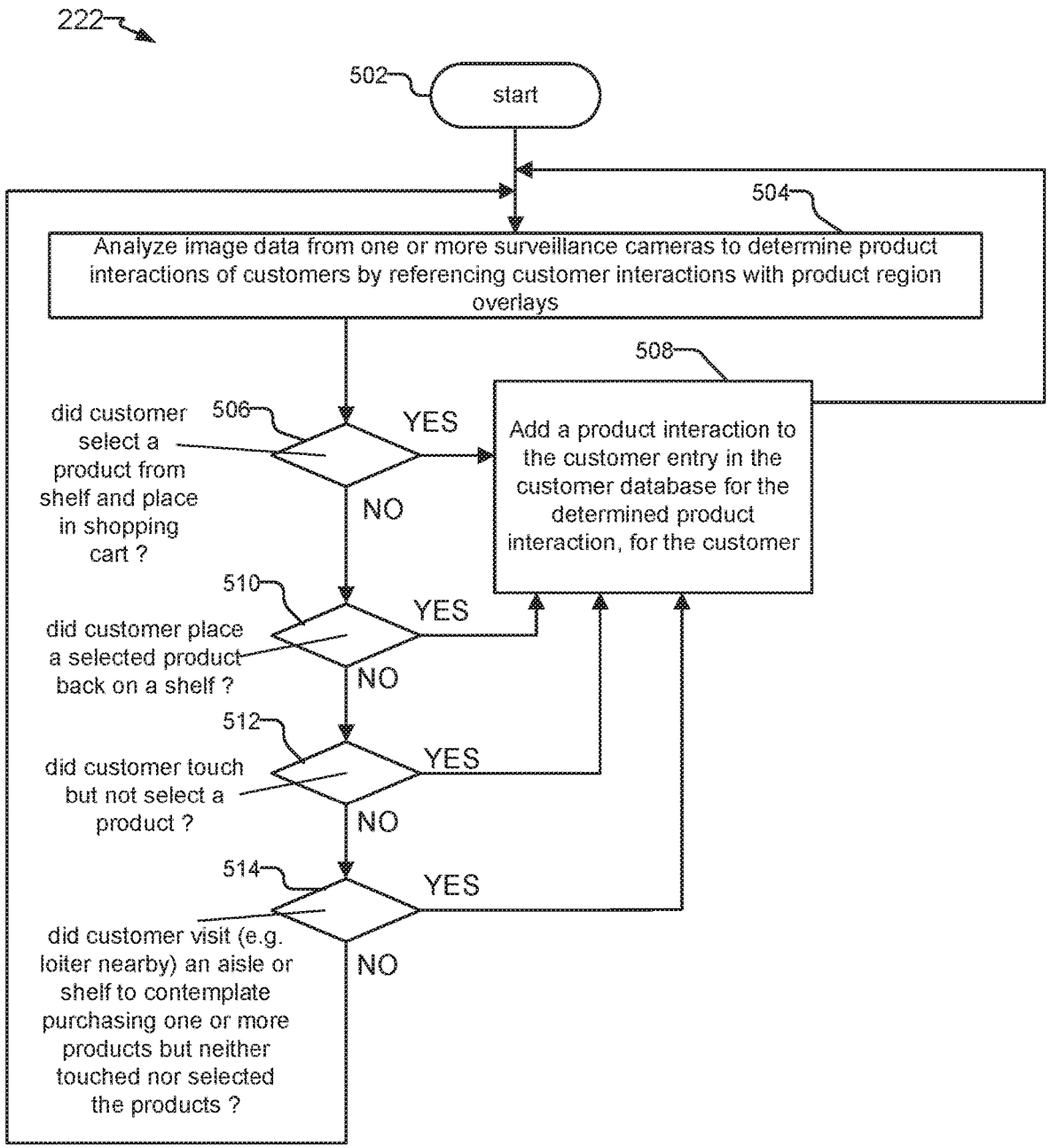
FIG. 3 is a flow diagram showing the process for detecting customer product interactions in the tracking database by the analytics system.

FIG. 3 shows a method of an analytics system 222 for determining product interactions from image data 250 of customer interactions with products 60, such as from image data 250 captured by camera3 103-3. The method begins in step 502.

In step 504, the analytics system 222 analyzes image data 250 from one or more surveillance cameras 103 to determine product interactions of customers 60 by referencing customer interactions with product region overlays 60. The products 60 are preferably located in predefined locations within the retail store 52, such as within specific shelves 98

(or portions of the shelves 98) of the retail shelving units 99. Because of this, installers can define associated product region overlays 60 for determining product interactions specific to each of the different types of products 92 from the image data including the customer interactions with the products 92.

In one implementation, the analytics system 222 determines product interactions for and facial image information 292 of the customers 60 from the image data 250 of the customer interactions with the products 93. The facial image information 292 and product interactions are then stored to a specific entry 272 for the associated customer in the customer database 290. The image data 250 analyzed for this purpose is captured by at least one surveillance camera 103 such as camera3 103-3 that tracks each of the customers 60 as they interact with the products 92. In one example, the at least one surveillance camera 103-3 might be a PTZ (point-tilt-zoom) style camera that captures and possibly tracks customers to collect image data 250 of the customers as they move through the retail store 52 and interact with products 92. In another example, dome-style surveillance cameras 103 are installed above each of the retail shelving units 99 and/or installed on walls or pillars within the retail store 52 in order to capture the customers 60 and the customer interactions with the products 92 from different perspectives.

According to step 506, the analytics system 222 determines if the customer 60 selected a product 92 from a shelf 98 and places it in their shopping cart 94.

This is also known as a product selection event, or "selection" product interaction. If a "selection" product interaction was determined, the method transitions to step 508 to add the "selection" product interaction to the customer entry 272 in the customer database 290 for the customer 60. Otherwise, the method transitions to step 510 to continue determining product interactions.

In step 510, the analytics system 222 determines if the customer 60 placed a selected product 92 back on a shelf. This is also known as a product deselection event, or "deselection" product interaction. If a "deselection" product interaction was determined, the method transitions to step 508 to add the "deselection" product interaction to the customer entry 272 in the customer database 290 for the current customer 60. Otherwise, the method transitions to step 512 to continue determining product interactions.

According to step 512, the analytics system 222 determines if the customer 60 touched but did not select a product 92. This is also known as a product touch event, or "touched but not selected" product interaction. If a "touched but not selected" product interaction was determined, the method transitions to step 508 to add the "touched but not selected" product interaction to the customer entry 272 in the customer database 290 for the current customer 60. Otherwise, the method transitions to step 514 to continue determining product interactions.

In step 514, the analytics system 222 determines if the customer 60 visited (e.g. loitered nearby) an aisle 70 or shelf 98 to contemplate purchasing one or more products 92 but neither touched nor selected the products. This is also known as a product hover event, or "neither touched nor selected" product interaction. If a "neither touched nor selected" product interaction was determined, the method transitions to step 508 to add the "neither touched nor selected" product interaction to the customer entry 272 in the customer database 290 for the current customer 60.

When a "neither touched nor selected" product interaction was not determined in step 514, and also upon conclusion of step 508, the method transitions to the beginning of step 504 to continue analyzing image data 250 from the cameras 250 with reference to the product region overlays 60 to determine product interactions for customers 60.

Figure 4:
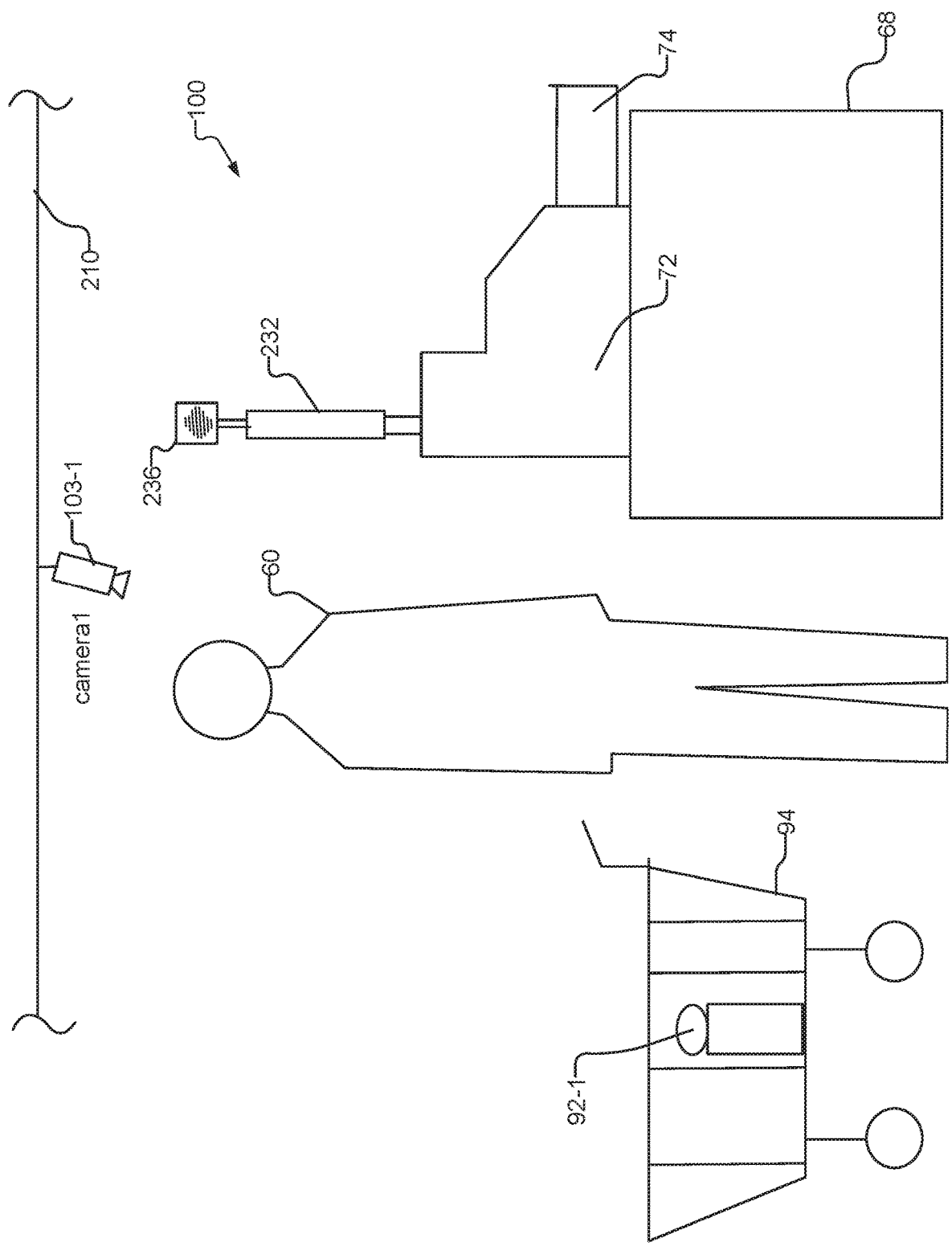
FIG. 4 is a schematic drawing showing a customer at the point of sale area.

FIG. 4 shows more detail for the point of sale area 100, when customers 60 arrive at the point of sale area. The customer 60 has selected a product 92-1 for purchase and included it within shopping cart 94. A drawer 74 of the point-of-sale terminal 72 is opened during a purchase transaction. The arrival of the customer 60 in FIG. 4 triggers the analysis methods of FIG. 5 and FIG. 6, and triggers the display of sale cues and other upsell information displayed at the point of sale terminal 72 displayed in FIG. 7.

Figure 5:
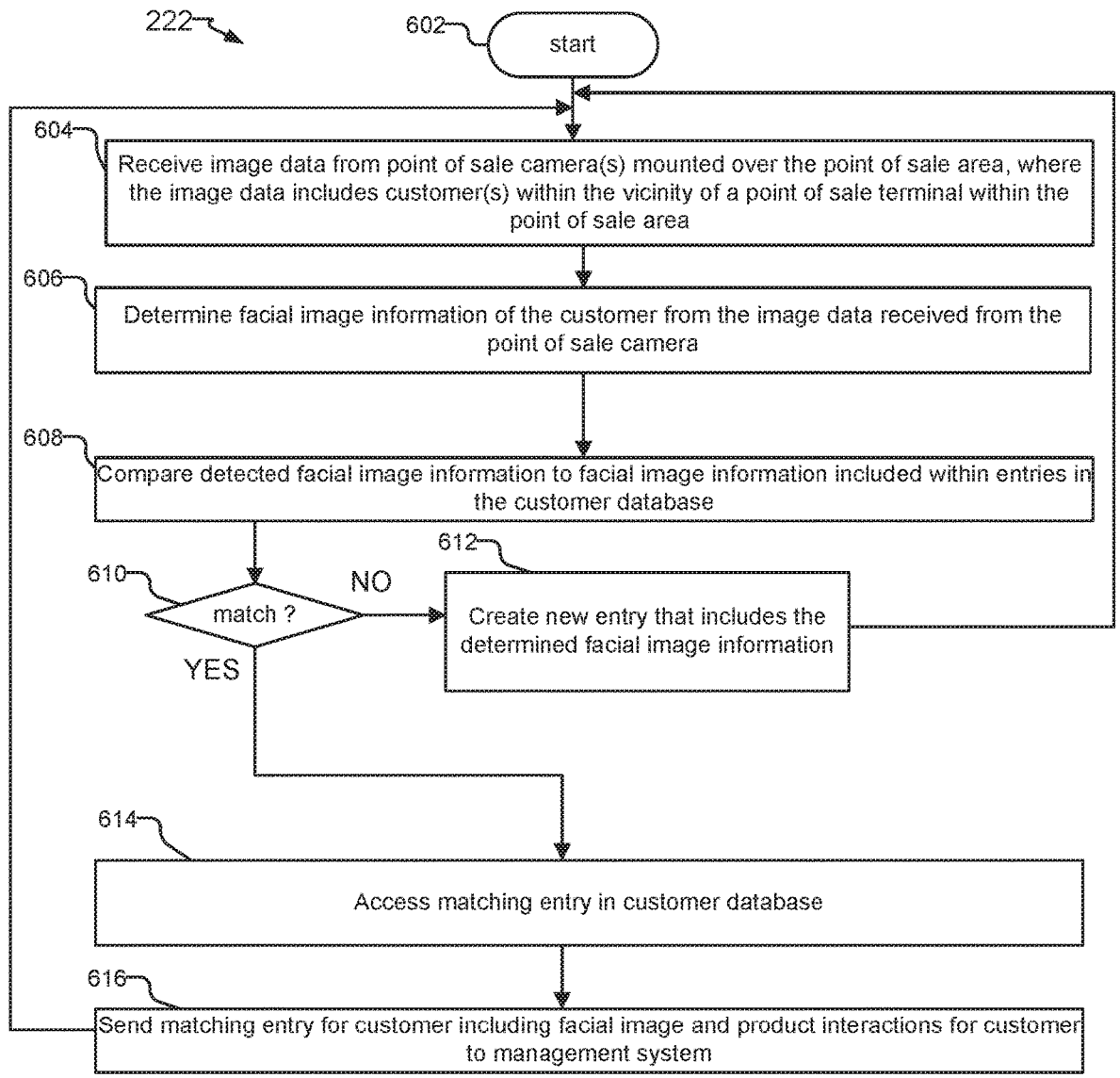
FIG. 5 is a flow diagram showing a process for recognizing customers at a point of sale area, accessing product interactions for the customers, and generating sale cues to the customer and/or point of sale operator by the analytics system.

FIG. 5 shows a method of an analytics system 222 for identifying customers 60 from their facial image information 292 and obtaining previously determined product interactions for the customer 60 when the customers 60 arrive at the point of sale area 100. The method begins in step 602.

In step 604, the analytics system 222 receives image data 250 from at least one point of sale camera(s) 103-1 mounted over the point of sale area 100, where the image data 250 includes customer(s) within the vicinity of a point of sale terminal 72 within the point of sale area 100. According to step 606, the analytics system determines facial image information 292 of the customer 60 from the image data 250 received from the point of sale camera 103-1.

In step 608, the analytics system 222 compares the determined facial image information 292 to facial image information 292 included within entries 272 in the customer database 290. If a match exists between the determined facial image information 292 and facial image information 292 included within an entry 272 of the customer database 290, according to step 610, the method transitions to step 614. Otherwise, the method transitions to step 612.

In step 612, the analytics system 222 creates a new entry 272 in the customer database 290 that includes the determined facial information 292 associated with detection of the new customer 60.

In step 614, the analytics system 222 accesses the matching entry 272 in the customer database 290 associated with the matched customer 60. Then, in step 616, the analytics system 222 sends the matching entry 272 for the customer 60 including the facial image information 292 and product interactions for the customer to the management system 234.

Upon conclusion of both steps 612 and 616, the method transitions to the beginning of step 604 to analyze additional image data 250 to identify customers 60 and obtain previously determined product interactions for the identified customers 60.

In another implementation, the analytics system 222 determines product interactions for and facial image information of the customers from the image data of the customer interactions with the products, such as from image data 250 captured by the surveillance cameras 103-3 positioned near the aisles 70 and retail shelving units 99 including the products 92. Then, when the customers 60 arrive at the point of sale area 100, the point of sale camera 103-1 in conjunction with the analytics system 222 determines facial information of the customer 60. The analytics system 222 then obtains product interactions 60 for the customer 60 by extracting the product interactions of an entry 272 in the customer database 290 having facial image information 292 matching that of the determined facial information of the customer 60 at the point of sale area 100.

Figure 6:
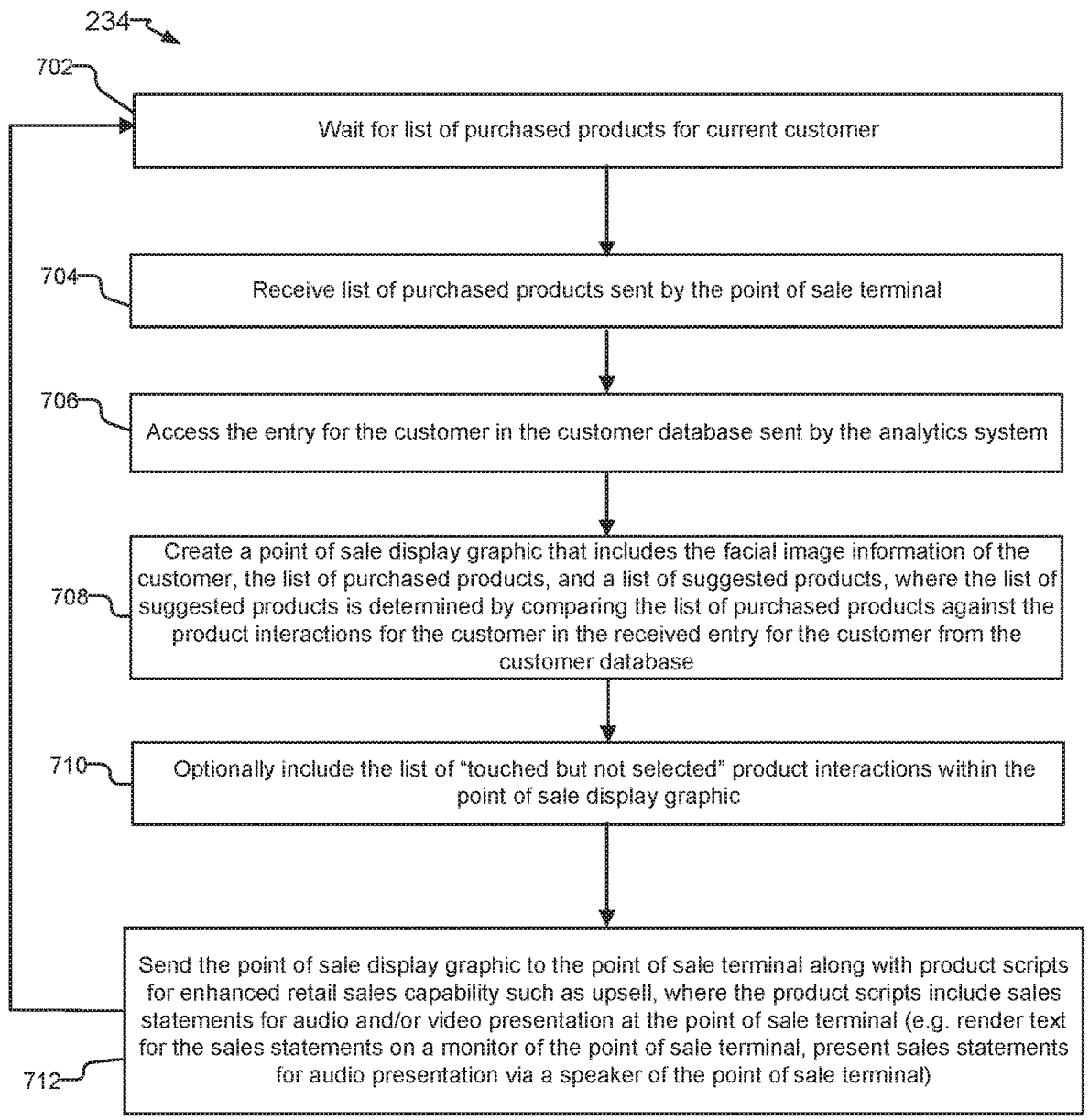
FIG. 6 is a flow diagram showing a process for generating point of sale graphics and product scripts by a management system.

FIG. 6 shows a method of a management system 234 which is generally used to apply business rules of a management system 234. The management system 234 receives product interactions of customers 60, and based on the product interactions, provides information concerning those product or other possibly competing or complimentary products for presentation at a point of sale area 100. The information, in one example, includes sales cues. The sales cues preferably include product scripts 282, that in turn include sales statements 294 associated with products 92 for audible and/or visible presentation at the point of sale area 100.

In step 702, the management system 234 waits for a list of purchased products for the current customer 60 that has arrived at the point of sale area 100. In step 704, the management system 234 receives a list of purchased products 284 for a customer 60 sent by the point of sale terminal 74 of the point of sale area 100. According to step 706, the management system 234 then accesses the entry 271 for the customer 60 in the customer database sent by the analytics system 222. The entry 271 was sent by the analytics system 222 upon completion of the method of FIG. 5.

In step 708, the management system 234 creates a point of sale display graphic 286 that possibly includes the facial image information 292 of the customer 60, the list of purchased products 284, and a list of suggested products 285. The list of suggested products is typically determined by comparing the list of purchased products 284 against the product interactions for the customer in the received entry 271 for the customer 60 from the customer database 290. According to step 710, the point of sale display graphic 286 can also include the "touched but not selected" product interactions determined in FIG. 5 step 512.

In step 712, the management system 234 sends the point of sale display graphic 286 to the point of sale terminal along with product scripts 282 for enhanced retail sales capability such as upsell, where the product scripts 282 include sales statements 294 for audio and/or video presentation at the point of sale terminal 72 (e.g. render text for the sales statements 294 on a display screen 232 of the point of sale terminal 74, present sales statements 294 for audio presentation via a speaker 236 of the point of sale terminal 74). Note that the sales statements 294 and/or the point of sale display graphic 286 can be presented to either a salesperson, the customer 60, or both the salesperson and the customer 60. Upon conclusion of step 712, the method transitions back to step 702 to await arrival the next list of purchased products for the current customer 60.

Figure 7:
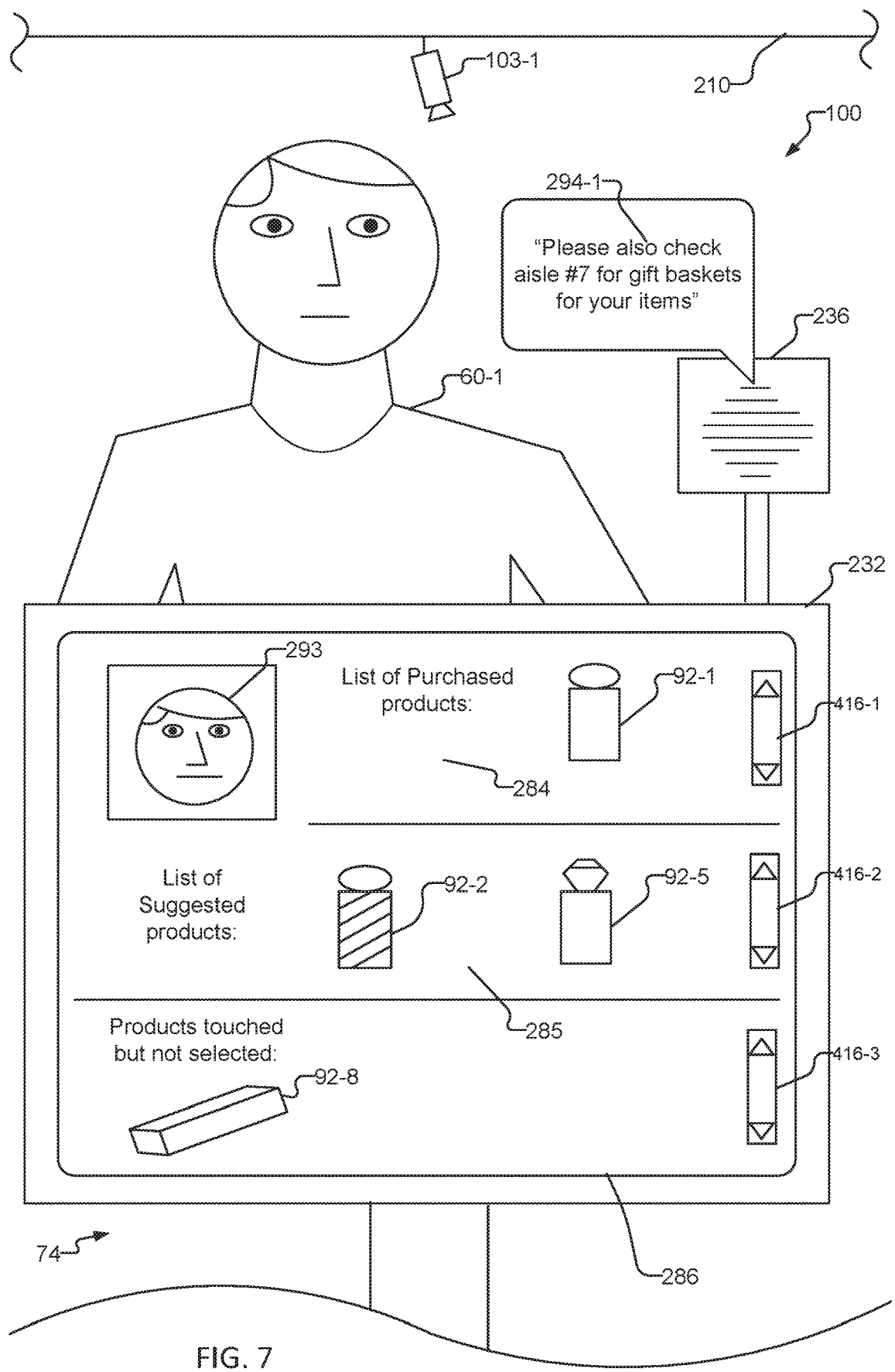
FIG. 7 is a schematic drawing showing a point of sale display graphic and sales statements of product scripts displayed at a point of sale area in association with a customer, where the point of sale display graphic and product scripts were generated in accordance with the method of FIG. 6.

FIG. 7 shows a customer 60-1 at a point of sale area 100. A point of sale display graphic 286 for the current customer 60-1 has been built by the management system 234 in accordance with the method of FIG. 6 and displayed on the display screen 232 of the point of sale terminal 74. A facial image 293 of the customer 60-1 has been rendered from the facial image information 292 of the customer 60-1, where the facial image information 292 is included in the entry 272 for the customer 60-1 provided to the management system 234 upon conclusion of the analytics system 222 method of FIG. 5. The product interactions for the customer 60-1 in the entry 272 were determined in accordance with the analytics system method of FIG. 3.

Included within the point of sale display graphic 286 are a list of purchased products 284 such as product 92-1, a list of suggested products 285, a list of products "touched but not selected" of the product interactions, and the facial image 293 of the customer 60-1. Scrollbars 416 are presented within the point of sale display graphic 286 to enable salespersons and customers 60 alike to be able to scroll through products 92 and other information in the various lists. For example, scrollbar 416-1 enables navigation of products purchased by the customer 60-1 in the list of purchased products 284.

In one implementation, the list of purchased products 284 for each of the customers 60 can be maintained in a temporary fashion via a "cached" version of the customer database 290 within the management system 234. Otherwise, the customer database 290 can include product interactions of customers 60-1 over time periods of months or even years. Moreover, for chains of retail stores 52, the product interactions of the same customer 60-1 within customer databases 290 at different locations of the retail stores 52 can be aggregated into an entry 272 of a virtual customer database 290 at the current retail store 52. In a similar vein, scrollbar 416-2 enables navigation of a list of suggested products 285 such as products 92-2 and 92-5, and scrollbar 416-3 enables navigation of a list of products touched but not selected, such as product 92-8.

Additionally, sales statements 294 can be provided for audible reproduction or and/or visible display at the point of sale area 100. In the illustrated example, an audible sales statement 294-1 of a product script 282 is presented by speaker 236 of the point of sale terminal 74. In one implementation, the management system 234 passes the product interactions for the customer 60-1 along with the lists of purchased products/suggested products 284/285 as arguments to the product scripts 282. Typically, different product scripts 282 are created for different products, types of products, or for departments within the retail store 52, in examples.

The product scripts 282, in turn, compare the passed-in arguments against predetermined conditional code blocks within the scripts 282. The conditional code blocks, in turn, include sales statements 294 tailored to each of the conditions associated with the conditional code blocks. For example, when the customer purchases perfume products 60-1, the list of purchased perfume products 60-1 are passed to the scripts 282. Scripts 282 having to do with sporting goods and unrelated merchandise will be unresponsive to the passed-in arguments. Scripts 282 associated with perfume merchandise and/or product-specific sales promotions, however, can include conditional code blocks for handling each and every type of perfume or groups of perfumes, in examples. When conditions associated with the conditional code blocks are satisfied by the passed-in arguments, the sales statements 294 within the satisfied conditional code blocks are presented by the management system 234 for audible and/or visible presentation at the point of sale area 100.

While this invention has been particularly shown and described with references to preferred embodiments thereof, it will be understood by those skilled in the art that various changes in form and details may be made therein without departing from the scope of the invention encompassed by the appended claims.

What is claimed is:
1. A retail system comprising:
at least one surveillance camera for generating image data of customer interactions with products with an analytics system analyzing the image data for the customer interactions with the products and determining product interactions from the image data of the customer interactions with the products;
at least one point of sale camera for generating image data of customers at a point of sale area with the analytics system analyzing the image data from the at least one point of sale camera to determine customers at the point of sale area; and a management system that is responsive to the analytics system and provides information based on the product interactions when the customers are determined to arrive at the point of sale including creating a point of sale display graphic displayed on a display screen, the display graphic including a list of suggested products based on the product interactions for the customer sent by the analytics system.

2. The system of claim 1, wherein the product interactions include:
products selected by the customers;
products touched but not selected by the customers;
products neither touched nor selected by the customers located near aisles or shelves visited by the customers.

3. The system of claim 1, further comprising a point of sale terminal of the point of sale area that provides a list of purchased products to the management system and presents the information provided by the management system.

4. The system of claim 3, wherein the point of sale terminal displays:
a point of sale display graphic that includes facial images of the customer, a list of purchased products, or a list of suggested products based on the list of purchased products or the product interactions.

5. The system of claim 1, wherein the information includes sale cues that include product scripts that include statements associated with products for audible or visual presentation at the point of sale area.

6. The system of claim 1, wherein the information is presented directly to the customers.

7. The system of claim 1, wherein the information is presented to a salesperson.

8. The system of claim 1, wherein the analytics system determines the product interactions from the image data of the customer interactions with the products by referencing product region overlays.

9. The system of claim 1, wherein the analytics system maintains a customer interaction database having entries for customers, and wherein each entry includes:
facial image information of a customer or the determined product interactions for the customer.

10. The system of claim 1, further comprising at least one surveillance camera that captures image data of customers near a doorway that enables the customers to enter into or exit, wherein the analytics system determines facial image information of the customers from the image data of the customers near the doorway.

11. A customer tracking method, the method comprising:
at least one surveillance camera generating image data of customer interactions with products;
at least one point of sale camera generating image data of customers at a point of sale area;
determining product interactions from the image data of the customer interactions with the products with an analytics system; and
providing information based on the product interactions when the customers arrive at the point of sale area including creating a point of sale display graphic displayed on a display screen, the display graphic including a list of suggested products based on the product interactions for the customer sent by the analytics system.

12. The method of claim 11, wherein determining the product interactions from the image data of the customer interactions with the products comprises analyzing the customer interactions with the products relative to product region overlays associated with the products.

13. The method of claim 11, wherein determining the product interactions from the image data of the customer interactions with the products comprises:
identifying products selected by the customers;
identifying products touched but not selected by the customers; and
identifying products neither touched nor selected by the customers located near aisles or shelves visited by the customers.

14. The method of claim 11, wherein providing the information based on the product interactions when the customers arrive at the point of sale area comprises:
building a point of sale display graphic including facial image information of the customer, a list of purchased products, and a list of suggested products based on the list of purchased products or the product interactions; and
displaying the point of sale display graphic at the point of sale area.

15. The method of claim 11, wherein providing the information includes providing sale cues with a management system receiving a list of purchased products from a point of sale terminal of the point of sale area, and providing the sales cues for presentation at the point of sale terminal in response.

16. The method of claim 11, wherein providing the information comprises:
determining facial image information of a customer from the image data of the customers generated at the point of sale area;
matching the determined facial image information of the customer to stored facial image information for the customer within an entry of a customer interaction database, and extracting product interactions for the customer from the matching entry;
determining sales cues based on the product interactions; and
presenting the sales cues at a point of sale terminal at the point of sale area.

17. The method of claim 11, further comprising at least one surveillance camera capturing image data of customers near a doorway, and determining facial image information of the customers from the image data of the customers near the doorway.

18. The method of claim 11, wherein the information comprises sale cues that include product scripts that include statements associated with products for audible or visual presentation at the point of sale area.

19. The method of claim 11, further comprising maintaining a customer interaction database having entries for customers, wherein each entry includes facial image information of a customer or the determined product interactions for the customer.

20. A sales promotion method, the method comprising:
at least one surveillance camera generating image data of customer interactions with products;
at least one point of sale camera for generating image data of customers at a point of sale area;
determining product interactions for and facial image information of the customers from the image data of the customer interactions with the products with an analytics system;
obtaining the product interactions for the customers when they arrive at the point of sale area; and presenting information at the point of sale area concerning other products based on the product interactions for the customers including creating a point of sale display graphic displayed on a display screen, the display graphic including a list of suggested products based on the interactions for the customer sent by the analytics system.

21. The method of claim 20, wherein obtaining the product interactions for the customers when they arrive at the point of sale area comprises:
   determining point of sale facial image information of the customers from the image data of the customers at the point of sale area; and
   providing the product interactions associated with facial image information matching the point of sale facial image information of the customers.

22. The method of claim 20, further comprising storing the product interactions for and facial image information of the customers determined from the image data of the customer interactions with the products.

23. The method of claim 20, wherein presenting information at the point of sale area concerning other products based on the product interactions for the customers comprises:
   creating a list of purchased products based on products purchased by the customers;
   creating a list of suggested products based on the list of purchased products or the product interactions; and
   providing the list of suggested products for display on a point of sale terminal of the point of sale area.

24. A sales promotion system, the system comprising:
   at least one surveillance camera for generating image data of customer interactions with products at a retail location;
   at least one point of sale camera for generating image data of the customers at a point of sale area, wherein an analytics system determines product interactions for and facial information of the customers from the image data of the customer interactions with the products; and
   a management system that is responsive to the analytics system and obtains the product interactions for the customers when the customers arrive at the point of sale area, and presents information concerning other products based on the product interactions for the customers including creating a point of sale display graphic displayed on a display screen, the display graphic including a list of suggested products based on the product interactions for the customer sent by the analytics system.

25. The system of claim 24, wherein the analytics system determines point of sale facial image information of the customers from the image data of the customers at the point of sale area, and wherein the management system provides the product interactions associated with facial image information matching the point of sale facial image information of the customers.

26. The system of claim 1, wherein the analytics system includes one or more product region overlays for use in determining the product interactions, and wherein a separate one of the product region overlays is defined for each product.

27. The system of claim 26, wherein the product region overlays are defined using a graphical user interface for outlining the product region overlays relative to a still frame of image data of a scene captured by the at least one surveillance camera.

28. The system of claim 1, wherein the analytics system determines the product interactions from the image data of the customer interactions with the products, by referencing product region overlays associated with the products, and the product region overlays are defined by outlining the product region overlays relative to a still frame of image data of a scene captured by the at least one surveillance camera.

* * * * *